United States Patent Office 3,548,012
Patented Dec. 15, 1970

3,548,012
IODOHYDRINS
John W. Cornforth, Sittingbourne, England, assignor to Shell Oil Company, New York, N.Y., a corporation of Delaware
No Drawing. Filed Oct. 18, 1968, Ser. No. 768,889
Int. Cl. C07c *31/34*
U.S. Cl. 260—634                                                       6 Claims

ABSTRACT OF THE DISCLOSURE

Olefin oxides are prepared by reacting olefins with iodine in the presence of water and an oxidizing agent to yield a product mixture from which the corresponding olefin oxide is recovered after treatment with base.

BACKGROUND OF THE INVENTION

It is known in the art that olefin oxides can be prepared by addition of hypochlorous acid or hypobromous acid to olefinic compounds, followed by treatment of the resulting chlorohydrin or bromohydrin product with base as represented by the following general Equation 1 wherein X and Cl or Br.

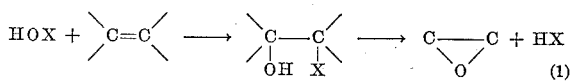

However, hypoiodous acid is not useful in this method of olefin oxide production because it is unstable with respect to its own oxidation and reduction and disproportionates rather than adds to an olefin reactant.

SUMMARY OF THE INVENTION

It has now been found that olefinic compounds are converted to the corresponding olefin oxides via an isolable vicinal iodohydrin intermediate by a process which comprises reacting the olefinic compound with iodine in the presence of an oxidizing agent in aqueous solution to form a product mixture and contacting the mixture with base to form the corresponding olefin oxide.

DESCRIPTION OF THE PREFERRED EMBODIMENTS

The olefinic reactant

The process of the invention is generally applicable to any olefinic compound having from 3 to 20 carbon atoms. Suitable olefinic compounds include aliphatic substituted-hydrocarbon olefinic compounds wherein the atoms other than carbon and hydrogen are halogens or oxygen, especially oxygen incorporated as functional groups such as hydroxy, alkoxy, aryloxy or carbalkoxy. Particularly preferred halogen substituted olefinic compounds are those wherein the halogen is not substituted on the olefinic double bond, i.e., not vinylic, and is of atomic number of from 17 to 35 inclusive, e.g., chlorine and bromine, and include lower acylic aliphatic halogen substituted monoolefins of from 3 to 6 carbon atoms such as allyl chloride, allyl bromide, 1-chlorobutene-2, 1,4-dichlorobutene-2, 3-bromobutene-1, 4-chlorobutene-1, 3-chloropentene-1 and 4-chlorohexene-2. Illustrative oxygen-containing olefins include olefinically unsaturated alcohols such as allyl alcohol, oleyl alcohol, abietyl alcohol, and cholesterol and olefinically unsaturated aliphatic esters such as methyl oleate, butyl acrylate and 2-ethylhexyl methacrylate.

The invention is used to particular advantage with hydrocarbon olefins containing only atoms of carbon and hydrogen, and particularly suitable olefinic hydrocarbon reactants comprise aliphatic or aromatic hydrocarbons having at least one non-aromatic olefinic linkage, i.e., a non-aromatic carbon-carbon double bond, but preferably free from acetylenic unsaturation.

Aliphatic hydrocarbons monoolefins of from 3 to 20 carbon atoms, particularly those of from 3 to 12 carbon atoms, are preferred for use in the invention. Suitable aliphatic hydrocarbon monoolefins include acyclic monoolefins, i.e., alkenes, of straight- and branched-chain structure such as propylene, 1-butene, 2-butene, isoamylene, 1-pentene, 2-hexene, 5-methyl-2-octene, dodecene and 1-hexadecene; and cyclic monoolefins, i.e., cycloalkenes, such as 1 - methylcyclopentene, cyclohexane, bicyclo (2.2.1)hept-2-ene, bicyclo(3.3 oct - .2 - ene and cyclododecene, and alkenylcycloalkanes, such as vinylcyclopentane, 2-butenylcyclohexane and isopropenylcycloheptane. Particularly preferred are aliphatic hydrocarbon monoolefins wherein one carbon atom of the carbon-carbon double bond has two hydrogen substituents, i.e., α-olefins such as propylene, 1-butene, 1-pentene, 1-hexene, methylenecyclopentane, 1-heptene, 1-octene, 1-dodecene, 3 - cyclopentylpropene-1, 2 - cyclopropylbutene-1 and 4-cyclohexylpentene-1, especially those of straight-chain acyclic structure, e.g., propylene.

Iodohydrin formation

In the process of the invention olefinic compounds are initially converted to product mixtures containing isolable vicinal iodohydrins by contacting the olefinic compound with iodine in an aqueous solution in the presence of an oxidizing agent. Suitable oxidizing agents are inert to the olefinic reactant and the products produced therefrom and are oxidizing agents which are capable of producing small equilibrium concentrations of hypoiodous acid through reaction with iodine in aqueous solutions when no olefinic compounds are present. Without wishing to be bound by any particular theory, it is believed that at the controlled reaction temperatures the oxidizing agent reacts with iodine to introduce hydroxyl and iodine to the olefinic compound, thereby forming an iodohydrin product.

One useful oxidizing agent is iodic acid. The overall net reaction between iodine, iodic acid and an olefin can be represented by the following Equation 2:

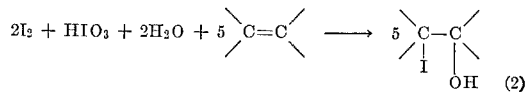

Iodic acid is particularly preferred for use in the invention due to the fact that it serves as an additional source of iodine for addition to the olefin. The iodic acid is employed as a preformed material or is conveniently generated in situ in the process of the invention from an iodate salt and a suitable acid. Suitable iodate salts are water-soluble metal iodates as illustrated by alkali metal iodates such as lithium iodate, sodium iodate, potassium iodate; alkaline earth iodates such as barium iodate, calcium iodate; and ammonium iodate. Suitable acids comprise strong inorganic mineral acids such as sulfuric acid and phosphoric acid and hydrocarbon carboxylic acids of up to 6 carbon atoms, e.g., alkanoic acids such as acetic acid, propionic acid and butyric acid. Particularly preferred for generation of iodic acid is the combination of potassium iodate and sulfuric acid. The iodic acid, when used as a preformed material, is prepared by conventional methods such as the action of fuming nitric acid or iodine or the electrolytic as the action of fuming nitric acid on iodine or the electrolytic oxidation of iodine.

Another suitable oxidizing agent is molecular oxygen, the role of which in the reaction mixture is represented by Equation 3:

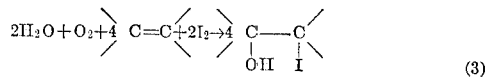

In the modification where molecular oxygen is employed as oxidizing agent, the molecular oxygen is used as such or it is diluted with an inert gas such as nitrogen or argon. In either modification, the reaction with oxygen is preferably conducted in the additional presence of a water-soluble inorganic nitrite salt as catalyst. Preferred nitrite salts are alkali metal nitrites such as lithium nitrite, sodium nitrite and potassium nitrite, and especially preferred is sodium nitrite. The nitrite salt is used in catalytic quantities, and amounts up to about 5% by weight based on iodine present are generally satisfactory, although amounts from about 1% by weight to about 3% by weight on the same basis are preferred.

The particular ratios of oxidizing agent to iodine and iodine to olefinic linkage is largely dependent on the stoichiometry of the reaction forming the iodohydrin product, e.g., as represented by Equations 2 and 3. Frequently these reactants are employed in the stoichiometric proportions prescribed by the overall balanced equations although due to the high cost of iodine, it is often advantageous to employ iodine as the limiting reagent, i.e., to employ the oxidizing agent or olefinic compound in excess. For example, molar ratios of oxygen or iodic acid to iodine of about 10:1 to about 1:2 are satisfactory, although best results are obtained by utilization of molar ratios of about 5:1 to about 1:2 on the same basis. Suitable molar ratios of iodine to olefinic linkage vary from about 10:1 to about 2:5 although molar ratios from about 5:1 to about 1:2 on the same basis are preferred.

The reaction of the olefin with iodine and the oxidizing agent to form the iodohydrin will proceed in water alone, but in order to increase the solubility of the olefinic reactant in the reaction mixture it is often advantageous to use a dilute aqueous solution additionally containing a suitable water-miscible, polar, organic cosolvent which is substantially chemically inert. Suitable water-miscible organic cosolvents include oxygen-containing solvents such as ethers, e.g., dioxane and tetrahydrofuran; nitrogen-containing solvents such as nitriles, e.g., acetonitrile, and dialkylamides, e.g., dimethylformamide; and sulfur-containing solvents such as sulfolane and dimethylsulfoxide. When a water-miscible cosolvent is employed, it is generally preferred to use about a 1:1 (v./v.) mixture of water and water-miscible cosolvent.

Initial amounts of iodine varying from about 5% wt. to about 30% wt. based on total volume of the aqueous reaction mixture is generally satisfactory, with amounts of iodine varying from about 10% wt. to about 20% wt. on the same basis being preferred.

The reaction of iodine, olefin and oxidizing agent is conducted by any of a variety of procedures. In one modification, the entire amounts of the reaction-mixture components are charged to an autoclave or similar reactor for operation in a batchwise manner. In an alternative modification one reaction-mixture component is added to others in increments, as by gradually adding a gaseous reactant such as oxygen or propylene to the reamining reaction-mixture components. In yet another modification, the reaction is conducted in a continuous manner as by contacting the reactants during passage through a tubular reactor.

The reaction is carried out at a temperature between room temperature and the boiling point of the iodine-containing solution, but it is usually preferable to work at an elevated temperature, e.g., from about 30° to about 90° C. Substantially atmospheric pressures are in general satisfactory, but for low-boiling reactants it is often advantageous to employ pressures sufficient to maintain at least a portion of the reactants in the liquid phase. Suitable pressures vary from atmospheric to about 1000 p.s.i.g. Freqeuntly good results are obtained by utilizing autogeneous pressures, that is, the pressure generated by the reaction mixture when maintained at reaction temperature in a sealed reaction system.

Subsequent to reaction, the aqueous or aqueous-organic solution of the iodohydrin product is used without further purification for conversion to the corresponding olefin oxide, although if desired the reaction mixture is separated and the iodohydrin is isolated by conventional methods such as fractional distillation, selective extraction, fractional distillation or the like.

Olefin oxide formation

The conversion of the olefin iodohydrin mixture, or the isolated iodohydrin to the corresponding olefin oxide is carried out by removing the elements of hydrogen iodide from the iodohydrin by treatment with an inorganic base. From stoichiometric considerations the reaction requires at least one equivalent of base per mole of iodohydrin, but to insure substantially complete conversion of the iodohydrin it is preferably to employ an excess of the base. Molar ratios of base to iodohydrin from about 20:1 to about 1:1 are generally satisfactory although molar ratios of from 10:1 to about 1:1 on the same basis are preferred. The completeness of the conversion of the iodohydrin to the epoxide increases with increasing pH of the reaction mixture, and hence it is generally convenient to use a base which will bring the pH of the mixture to at least pH 8, but preferably at least pH 10. Suitable inorganic bases therefore include alkali metal carbonates such as sodium carbonate and potassium carbonate; alkali metal oxides and hydroxides such as lithium hydroxide, sodium oxides and hydroxides such as lithium hydroxide, sodium oxide, potassium hydroxide, potassium oxide and cesium hydroxide, alkaline earth oxides and hydroxides such as calcium hydroxide, barium hydroxide and barium oxide; aluminum oxide and hydroxide; and mixtures thereof. One particularly useful mixture is the combination of an alkali metal oxide or hydroxide with aluminum oxide or hydroxide in the form of an alkali metal aluminate, for example, sodium aluminate illustratively formed from a mixture of sodium hydroxide and aluminum hydroxide. Equally useful are alkaline earth aluminates formed from alkaline earth metal oxides or hydroxide and aluminum oxide or hydroxide, e.g., barium aluminate. Such alkali metal and alkaline earth aluminates are well known in the art where a comprehensive review of their preparation is given by Mellor in "A Comprehensive Treatise on Inorganic and Theoretical Chemistry," volume 5, Longmans and Green, London, 1924. Broadly speaking, alkali metal aluminates and alkaline earth aluminates are prepared by mixing aluminum oxide or hydroxide with an alkali metal or alkaline earth metal base in molar ratios of about 3:1 to about 1:3.

The formation of the olefin oxide is conducted by intimately contacting the iodohydrin product with the inorganic base in an inert reaction solvent which is liquid at the reaction temperature and pressure. Suitable solvents comprise water or dilute aqueous solutions containing suitable water-miscible, polar, organic solvents such as those used as solvents in producing the aqueous iodohydrin product mixture, i.e., oxygen-containing solvents such as, e.g., dioxane and tetrahydrofuran; nitrogen-containing solvents such as nitriles, e.g., acetonitrile, and dialkylamides, e.g., dimethylformamide; and sulfur-containing solvents such as sulfolane and dimethylsulfoxide. As a consequence, in the preferred modification of the reaction, the aqueous solution of the iodohydrin product mixture is the desired reaction medium for olefin oxide formation and the presence of an additional solvent or diluent is not necessary.

The intimate contacting of the iodohydrin and inorganic base is carried out by a variety of methods. The reaction is suitably carried out in a batchwise manner as by adding the entire amount of inorganic base to the iodohydrin product mixture in a suitable reactor and maintaining the mixture at reaction temperature until reaction is complete. Alternatively, it is useful to add one reaction mixture component to the others, as by gradually adding the base to a solution of the iodohydrin. In yet another modification, the reaction is conducted by heating, at an elevated temperature, a solution of the iodohydrin and base and distilling out the olefin oxide directly from the solution.

A particular advantage of the process of the invention is the ease with which iodide salts eliminated from the iodohydrin are oxidized to iodine for further use in the process. This is particularly true when a strong inorganic base such as sodium aluminate or barium aluminate is used due to the fact that iodine is readily recovered from the iodide salt merely by heating with air. By way of example, the following equations represent the generation of propylene oxide by the treatment of propylene iodohydrin with sodium aluminate followed by air oxidation to regenerate the sodium aluminate and also the iodine used to form the iodohydrin.

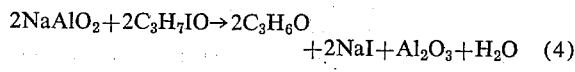

$$2NaAlO_2 + 2C_3H_7IO \rightarrow 2C_3H_6O + 2NaI + Al_2O_3 + H_2O \quad (4)$$

$$4NaI + 2Al_2O_3 + O_2(air) \rightarrow 4NaAlO_2 + 2I_2 \quad (5)$$

The olefin oxide products are materials of established utility and many are chemicals of commerce. For example, illustrative olefin oxides which are readily prepared by the process of the invention such as propylene oxide, 1,2-epoxybutane, 2,3-epoxybutane, isobutylene oxide, cyclohexene oxide, 1,2-epoxydodecane and 1,2-epoxyhexadecane are formulated into useful polymers by polymerization or copolymerization as disclosed by U.S. Pats. 2,815,343, 2,871,219 and 2,987,489. Propylene oxide is currently prepared on a large commercial scale by the classic chlorohydrin process.

To further illustrate the improved process of the invention, the following examples are provided. It should be understood that the details thereof are not to be regarded as limitations, as they may be varied as will be understood by one skilled in this art.

EXAMPLE I

Iodine (2.54 g.) and potassium iodate (1.07 g.) were mixed with water (75 ml.) and sulfuric acid (1 ml. of 5 N). The mixture was stirred at 50° C. in an atmosphere of propylene. After eight hours, 600 ml. of gas had been absorbed. The solution was cooled and extracted with ether, and the dried extract was distilled. Propylene iodohydrin (3.7 g.) was collected at 28° C./0.05 mm. Hg, and was identified by comparison with authentic material; it consisted of 1-iodo-2-propanol with approximately 5% of 2-iodo-1-propanol. The yield obtained is 80% of the theoretically possible according to the equation:

$$4I_2 + 2KIO_3 + H_2SO_4 + 10C_3H_6 + 4H_2O = 10C_3H_7IO + K_2SO_4$$

In another reaction carried out in the same manner as above, the aqueous solution, obtained after absorption of propylene was complete and treated with an excess of 0.1 N sodium hydroxide solution. Propylene oxide was formed immediately and was identified, after extraction into bromobenzene, by gas-liquid chromatography in comparison with authentic propylene oxide.

EXAMPLE II

Iodine (50.8 g.), potassium iodate (23.55 g.), water (1280 ml.), dioxane (320 ml.) and sulfuric acid (20.6 ml. of 5.34 N) were stirred together under propylene at 45° C. After 1½ hours, 11.5 liters of propylene had been absorbed. The mixture was cooled and a suspension of calcium hydroxide (22 g.) in water (100 ml.) was added. The pressure was reduced, when propylene oxide distilled and was condensed in a cold receiver. Redistillation through a column gave propylene oxide (20 g.), B.P. 36° C., identified by comparison with authentic material.

EXAMPLE III

The conditions for reaction with propylene were the same as in Example II except that acetic acid (43 ml. of 5 N) was used instead of the sulfuric acid. When absorption of propylene had ceased, the solution was extracted with chloroform, and the solvent extract decolorized by shaking with a little sodium thiosulfate solution, dried, and then evaporated at low pressure. The residual oil was distilled at 4 mm. Hg pressure through a column and yielded 73 g. (78% of theory) of propylene iodohydrin, B.P. 49–52° C.

EXAMPLE IV

Apparatus

The reaction vessel used was a 1-liter Pyrex Buchner flask containing a 6 cm. polytetrafluoroethylene-coated magnetic stirring bar and fitted with a rubber stopper carrying a stopcock tube. The side-arm of the flask was connected by rubber tubing and a 3-way tap to either of two gas reservoirs (of 2.5- and 1-liter capacity), in which a mixture of propylene oxygen (4 propylene:1 oxygen, by volume) was confined over water. The propylene ordinarily used was Matheson CP grade, and care was necessary after filling the reservoirs to mix the two gases thoroughly by inverting the reservoirs several times.

The flask was charged with reagents and solvent, evacuated via the stopcock tube, and filled with gas from the smaller reservoir. It was then isolated from the reservoirs, immersed with 5 cm. of the side-arm in water preheated to the reaction temperature (usually 70°), and magnetic stirring was started. After a minute or two when the initial rise of pressure due to heating had subsided, the larger reservoir was connected and absorption of gas allowed to proceed. When necessary, additional reagents were added through the stopcock tube, after slightly reducing the pressure in the flask to avoid loss of gas when the stopcock was opened. Finally, stirring was stopped and the reaction vessel was lifted from the bath and allowed to cool while connected with the smaller reservoir. The total gas absorption was noted.

Procedure

The above reactor was charged with dioxane (25 ml.), water (25 ml.), iodine (5.08 g.) and sodium nitrite (0.12 g.). The reaction was run at 70° and 1230 ml. of gas were absorbed in 1¼ hours. The reaction mixture required 2.0 ml. of 0.8 N sodium thiosulfate solution to decolorize it; this corresponds to 0.20 gram (4%) of unreacted iodine. The product was extracted with ether and the dried ethereal extract was evaporated at low pressure. Distillation at 3.6 mm. pressure gave propylene iodohydrin (6.50 g.; 87%), B.P. 46–48°. The small residue (ca. 0.2 g.) contained a little more iodohydrin and the by-product diiododipropyl ether.

EXAMPLE V

The reactor described in Example IV was charged with tert-butanol (30 ml.), water (70 ml.), iodine (11.6 g.) and sodium nitrite (0.24 g.), and the gas reservoirs filled with propylene/oxygen (4:1 by volume). The temperature was 70°. No acid was added during the run, which was stopped after 60 minutes; 2500 ml. gas having been absorbed. The solution required 13 ml. of 0.8 N thiosulfate to decolorize it (≡1.3 unreacted iodine). The product was extracted with ether and distilled, yielding propylene iodohydrin (13.9 g., 82% on iodine taken, 92% on iodine converted), B.P. 51°/5 mm.

EXAMPLE VI

The reactor described in Example IV was charged with iodine (10.16 g.), water (50 ml.), and sodium nitrite (0.12 g.), and isobutylene/oxygen (4:1 by volume) used as the gas. The temperature was 70°. Sulfuric acid (0.5 ml. of N) was added at 10, 15, 20, 25, 30, 35 and 40 minutes. Additional sodium nitrite was added (0.12 g. at 27 min. and 0.06 g. at 75 min.). The total time was 100 minutes when the gas absorbed was 2430 ml. The product required 4.8 ml. 0.8 N sodium thiosulfate to decolorize: 0.48 g. (4.7% unreacted iodine). The two-phase reaction mixture was extracted five times with 15 ml. ether, and distillation at 5 mm. pressure gave isobutylene iodohydrin (11.8 g.), B.P. 52°.

EXAMPLE VII

The reactor system described in Example IV was used. The charge was iodine (10.16 g.), sulfolane (25 ml.), water (25 ml.), and sodium nitrite (0.24 g.). The temperature was 80°, and gas phase was 4:1 v./v. ethylene: oxygen. Sulfuric acid (0.5 ml. of N) was added at 20, 25, 38, 45, 55, 65 and 75 minutes. Additional sodium nitrite (0.12 g.) was added at 55 minutes and heating was stopped after 195 minutes. The solution required 22 ml. 0.8 N sodium triosulfate to decolorize it. Ethylene diiodide was separated by filtration, and the filtrate was saturated with salt and extracted with ether (5×25 ml.). Distillation of the dried ether solution yielded impure ethylene iodohydrin (6 g.), B.P. 84–86/16 mm., which was decolorized by a little sodium thiosulfate and redistilled. (Found (percent): C, 13.8; H, 3.0; I, 73.9. Calc. for $C_2H_5IO$ (percent): C, 13.95; H, 2.9; I, 73.85)

EXAMPLE VIII

The reactor described in Example IV was charged with dioxane (25 ml.), water (25 ml.), iodine (10.16 g.) and sodium nitrite (0.24 g.), and the gas reservoirs filled with propylene/oxygen (4:1 by volume). The temperature was 70°. Six successive additions of 0.5 ml. N sulfuric acid were made at 5-minute intervals after the reaction had run for fifteen minutes. After 60 minutes, the uptake of gas was 2530 ml.

The resulting yellow solution (pH about 3) was added during 10–15 minutes to a stirred suspension of calcium hydroxide (4 g.) in a little water. A check experiment had shown that the mixture under these conditions was always alkaline. The pressure was then reduced to about 50 mm. and the mixture was warmed. Propylene oxide with some solvent, water and diiododipropyl ether distilled and was collected in a cold trap (−70°) to yield 4.04 g. (87% yield) of propylene oxide.

EXAMPLE IX

The reactor described in Example IV was charged with sulfolane (25 ml.), water (25 ml.), iodine (10.16 g.) and sodium nitrite (0.24 g.), and the gas reservoirs filled with propylene/oxygen (4.1 by volume). The temperature was 70°. Sulfuric acid (total 2.5 ml. of N) was added in 0.5 ml. portions at 15, 20, 25, 30 and 50 minutes after the start. The total time was 75 minutes, 2665 ml. gas being absorbed and the final pH being 4.0.

The reacted mixture was added slowly to a slurry of calcium hydroxide (4 g.) in water (5 ml.). The flask was immersed in an oil bath preheated to 130°, and propylene oxide and diiododipropyl ether were distilled, along with water. The yield of propylene oxide was 83.5% and that of crude diiododipropyl ether was 345 mg. (2.4%).

EXAMPLE X

The reactor system described in Example IV was used, the gas being isobutylene:oxygen (4:1 by volume). The reactor charge was iodine (10.16 g.), dioxane (25 ml.), water (25 ml.), and sodium nitrite (0.24 g.), and the temperature was 70°. Sulfuric acid (0.5 ml. of N) was added at 6.5, 10, 15, 20, 25, 30 and 35 minutes. Additional sodium nitrite (0.02 g.) was added at 43 minutes. The reaction was stopped at 60 minutes, when the gas uptake was 2695 ml. The mixture was added to 4 g. calcium hydroxide and the epoxide was distilled at 50 mm. to yield 85.5% theoretical of isobutylene oxide.

EXAMPLE XI

The reactor system described in Example IV was used. The charge was iodine (12.7 g.), dioxane (100 ml.), water (100 ml.), and sodium nitrite (0.3 g.). The reservoir contained pure oxygen. While stirring at 50° allyl chloride (7.65 g.) was introduced gradually. The reaction was slow; after six hours 530 ml. of gas had been absorbed (0.15 g. sodium nitrite added after three hours). The mixture required 60 ml. of 0.8 N sodium thiosulfate to decolorize it (6.0 g.=47% unreacted iodine). The mixture was extracted with ether and the product was distilled to give the chloro-iodopropanol (8.6 g.), B.P. 52–54°/0.2 mm. Treatment of this product in the usual manner with calcium hydroxide produced epichlorohydrin (identified by B.P., IR and GLC).

EXAMPLE XII

The apparatus used was a Parr hydrogenator with a pressure-tested 500 ml. Pyrex bottle. The rubber stopper as well as carrying the gas inlet was pierced by (i) a stainless steel capillary tube, connected externally with polyethylene capillary tubing allowing injection of acid at intervals from a syringe, (ii) a thermocouple to measure the internal temperature. The bottle was wrapped with heating tape supplied with current through a Variac. The reservoir of the hydrogenator was charged with 4:1 propylene:oxygen mixture at a pressure of 59 lb./sq. in. gauge (p.s.i.g.). The reactor was charged with dioxane (25 ml.), water (25 ml.), iodine (10.16 g.), and sodium nitrite (0.24 g.). It was then evacuated, and shaking and heating were begun. Propylene-oxygen mixture was introduced to give a slowly increasing reactor pressure, as shown in the table below. Sulfuric acid (0.25 ml. of N) was introduced at each minute up to 12 minutes.

| Time, min. | Reactor temp., °C. | Reactor pressure, p.s.i.g. | Reservoir pressure, p.s.i.g. |
|---|---|---|---|
| 0 | 60 | 20 | 56 |
| 1 | 64 | 20 | 55 |
| 2 | 70 | 20 | 53.5 |
| 3 | 73 | 20 | 51.5 |
| 4 | 76 | 25 | 50 |
| 5 | 80 | 25 | 49.5 |
| 6 | 80 | 25 | 49 |
| 7 | 82 | 30 | 49 |
| 8 | 82 | 30 | 48 |
| 9 | 84 | 30 | 48 |
| 10 | 84 | 40 | 47 |
| 11 | 85 | 40 | 47 |
| 12 | 86 | 45 | 46.5 |
| 18 | Heat off | | |

The reaction mixture required 2.4 ml. 0.8 N sodium thiosulfate to decolorize it (2.4% unreacted iodine). It was added as usual to 4.0 g. calcium hydroxide and the propylene oxide was distilled at 50 mm. pressure and determined as before. The yield was 84% (on iodine taken; 86% on iodine converted).

EXAMPLE XIII

Propylene iodohydrin (19 g.) in ethylene dichloride (100 ml.) was stirred and heated under a fractionating column with moist sodium aluminate on alumina (75 g., prepared by mixing 100 g. chromatography-grade alumina with 20 ml., 10 N sodium hydroxide). Propylene oxide (6.0 g.) distilled at 36°. After drying, it weighed 5.8 g. (99%).

EXAMPLE XIV

The gas phase was propylene:oxygen 4:1. The reactor contained iodine (10.16 g.), sodium nitrite (0.24 g.), acetonitrile (25 ml.) and water (25 ml.). The temperature was 55°. Sulfuric acid (3 ml. of N) was added gradually between 8 and 20 minutes after starting the stirring. After 65 minutes, titration showed that 0.8 g. iodine remained. The reaction mixture was added to a stirred slurry of calcium hydroxide (4.0 g.) in water and the mixture was distilled up to 82° at atmospheric pressure. The distillate was made up to 100 ml. and the propylene oxide was determined by titration of a 5 ml. portion with sodium thiosulfate and acetic acid as previously described. The yield of propylene oxide was 65% of the theoretical.

EXAMPLE XV

The gas phase was cis-2-butene and the reactor contained iodine (10.16 g.), potassium iodate (4.3 g.), dioxane (25 ml.), water (5 ml.) and N sulfuric acid (20 ml.). The temperature was 40° C. Approximately 2.5 liters of gas were absorbed in 60 minutes. Titration with sodium thiosulfate showed that 0.8 g. iodine remained. The reaction mixture was added to a slurry of calcium hydroxide (4.0 g.) in water and the product was distilled at 200 mm. pressure into a cold trap. The distillate was redistilled at atmospheric pressure and the fraction boiling below 80° C. was dried with calcium chloride and redistilled. This gave 2.7 g., B.P. 59–61°, which was shown by infrared and nuclear magnetic resonance spectroscopy to consist of cis-2-butene oxide containing a small proportion of 2-butanone.

EXAMPLE XVI

A mixture of iodine (10.16 g.), allyl alcohol (4.64 g.), and water (50 ml.) was stirred at 70° C. under oxygen. Sodium nitrite (0.12 g.) was added at 0 and 26 minutes; N sulfuric acid (0.5 ml.) was added at 10, 15, 20, 25, 30, 35, 40 and 45 minutes. After 90 minutes the mixture was cooled. Oxygen absorption had been 580 ml. Titration with thiosulfate showed that 0.34 g. iodine remained. The mixture was extracted with ether (15 ml.) which removed partly crystalline oily material containing 2,6-bis(iodomethyl)-1,4-dioxane, M.P. 158–160°. (Found (percent): C, 19.6; H, 2.6; I, 69.0. Calculated for $C_6H_{10}I_2O_2$ (percent): C, 19.6; H, 2.7; I, 69.0). The aqueous liquid was extracted many times with ether and the extracted product was distilled at 0.02 mm. pressure to give glycerol monoiodohydrin as an oil, B.P. 72° (3.25 g.). (Found (percent): C, 17.8; H, 3.6; I, 62.9. Calculated for $C_3H_7IO_2$ (percent): C, 17.8; H, 3.5; I, 62.9).

I claim as my invention:

1. The process of preparing an organic vicinal iodohydrin by intimately contacting an aliphatic monoolefin of from 3 to 20 carbon atoms with iodine and an oxidizing agent selected from iodic acid and oxygen, wherein the molar ratio of said oxidizing agent to iodine is from about 10:1 to about 1:2 in liquid-phase aqueous solution at a temperature of about 30° to about 90° C.

2. The process of claim 1 wherein the oxidizing agent is iodic acid generated in situ from an acid and a water-soluble metal iodate salt.

3. The process of claim 1 wherein the oxidizing agent is oxygen and wherein a water-soluble inorganic nitrite salt is additionally present in proportions up to about 5% by weight of iodine.

4. The process of claim 1 wherein the monoolefin is a hydrocarbon α-olefin.

5. The process of claim 4 wherein the α-olefin is propylene.

6. The process of claim 4 wherein the α-olefin is pentene-1.

References Cited

H. Remy: Treatise on Inorganic Chemistry, vol. I (1956), pp. 811–13.

M. S. Malinovskii: Epoxides and Their Derivatives (1965), pp. 39 and 66.

Houben-Weyl: vol. 5/4 (1960), page 540.

NORMA S. MILESTONE, Primary Examiner

U.S. Cl. X.R.

260—348.6